(12) United States Patent
Nalawade et al.

(10) Patent No.: US 7,633,874 B1
(45) Date of Patent: Dec. 15, 2009

(54) SOFT NOTIFICATION MESSAGING FOR A ROUTING PROTOCOL

(75) Inventors: Gargi Nalawade, San Jose, CA (US); Keyur P. Patel, San Jose, CA (US); John Galen Scudder, Ann Arbor, MI (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 931 days.

(21) Appl. No.: 10/833,811

(22) Filed: Apr. 28, 2004

(51) Int. Cl.
*G06F 11/00* (2006.01)
*G01R 31/08* (2006.01)
*G08C 15/00* (2006.01)
*G06F 15/173* (2006.01)

(52) U.S. Cl. .................. 370/238; 370/254; 370/255; 709/241; 709/242

(58) Field of Classification Search .............. 370/392, 370/469, 351, 400, 401, 466, 467
See application file for complete search history.

(56) References Cited

U.S. PATENT DOCUMENTS

| | | | |
|---|---|---|---|
| 5,519,704 | A | 5/1996 | Farinacci et al. |
| 5,892,763 | A * | 4/1999 | Laraqui et al. ......... 370/395.53 |
| 5,917,820 | A | 6/1999 | Rekhter |
| 6,144,641 | A * | 11/2000 | Kaplan et al. ............... 370/238 |
| 6,339,595 | B1 | 1/2002 | Rekhter et al. |
| 6,463,061 | B1 | 10/2002 | Rekhter et al. |
| 6,526,056 | B1 | 2/2003 | Rekhter et al. |
| 6,539,427 | B1 | 3/2003 | Natarajan et al. |
| 6,577,597 | B1 | 6/2003 | Natarajan et al. |
| 6,584,502 | B1 | 6/2003 | Natarajan et al. |
| 6,601,127 | B1 * | 7/2003 | Nomura et al. ............. 710/306 |
| 2003/0140167 | A1 * | 7/2003 | Harvey et al. ............... 709/238 |
| 2004/0006640 | A1 * | 1/2004 | Inderieden et al. .......... 709/242 |
| 2004/0076149 | A1 * | 4/2004 | Parent et al. ................ 370/389 |
| 2004/1008838 | * | 5/2004 | Shah .......................... 709/221 |
| 2005/0047406 | A1 * | 3/2005 | Hares ......................... 370/389 |

OTHER PUBLICATIONS

Sangli et al. ("Graceful Restart Mechanism for BGP", Dec. 2002, pp. 1-11).*

(Continued)

*Primary Examiner*—Chi H Pham
*Assistant Examiner*—Farah Faroul
(74) *Attorney, Agent, or Firm*—Cesari and McKenna, LLP

(57) ABSTRACT

A soft notification technique isolates address family application based errors or events occurring within a routing protocol, such as the Border Gateway Protocol (BGP), used to exchange routing information between a router and its peer router over a BGP session operating on a reliable transport. The technique apportions the session into a plurality of logical subsets, each of which is associated with an address family application (AFI/SAFI) module of a BGP protocol executing on the routers. BGP soft notification messaging is employed to allow the router to notify its peer of an isolated error condition or event associated with an AFI/SAFI module. Isolation of the error/event enables restart ("soft reset") of only the associated AFI/SAFI module, thereby obviating the need to reset or terminate the entire BGP session and reliable transport between the router and peer. Notably, soft reset of the module occurs without disrupting services provided by other AFI/SAFI modules of the BGP protocol.

34 Claims, 10 Drawing Sheets

OTHER PUBLICATIONS

Radia Perlman, Interconnections, Bridges and Routers, Addison Wesley Publishing Company, pp. 323-329, 1992.

Rekhter et al., "A Border Gateway Protocol 4 (BGP-4)" Request For Comments (RFC) 1771, Internet Engineering Task Force, http://www.ietf.org, Mar. 1995, pp. 1-57.

Rekhter et al, <draft-ietf-idr-bgp4-23.txt> "A Border Gateway Protocol 4 (BGP-4)", Internet Engineering Task Force, Nov. 2003 pp. 1-98.

Bates et al, "Multiprotocol Extensions for BGP-4" Request for Comments (RFC) 2858, Internet Engineering Task Force, http://www.ietf.org/rfc/rfc2858.txt, Jun. 2000 pp. 1-11.

Chandra et al, "Capabilities Advertisement with BGP-4" RFC 3392, Internet Enginerring Tast Force, http://www.ietf.org/rfc/rfc3392.txt Nov. 2002, pp. 1-6.

Nalawade et al, <draft-nalawade-bgp-soft-notify-00.txt> "BGPv4 Soft-Notification Message", Internet Engineering Task Force, http://www.ietf.org/internet-drafts/draft-nalawade-bgp-soft-notify-00.txt, Oct. 2003, pp. 1-9.

Reynolds et al, "Assigned Numbers" Request for Comments (RFC) 1700, Internet Engineering Task Force, http://www.ietf.org/rfc/rfc1700.txt, Oct. 1994 pp. 1-215.

"Address Family Numbers", http://www.iana.org/assignments/address-family-numbers, last updated May 14, 2002.

"SAFI-Subsequence Address Family Identifier per (RFC2858)", http://www.iana.org/assignments/safi-namespace, last updated Feb. 12, 2004.

Tanenbaum, Andrew S., "Computer Networks" Third Edition; Chapter 1, Section 1.4.2, "The TCP/IP Reference Model"; Prentice Hall PTR, 1996, New Jersey, pp. 35-38.

* cited by examiner

| ADDRESS FAMILY IDENTIFIER (AFI) 612 |
|---|
| SUBSEQUENT ADDRESS FAMILY IDENTIFIER (SAFI) 614 |
| LENGTH OF NEXT HOP NETWORK ADDRESS 616 |
| NETWORK ADDRESS OF NEXT HOP 618 |
| ⋮ |

MP_REACH_NLRI PATH ATTRIBUTE 610

| ADDRESS FAMILY IDENTIFIER (AFI) 652 |
|---|
| SUBSEQUENT ADDRESS FAMILY IDENTIFIER (SAFI) 654 |
| WITHDRAWN ROUTES 656 |

MP_UNREACH_NLRI PATH ATTRIBUTE 650

FIG. 6

SOFT NOTIFICATION MESSAGING FOR A ROUTING PROTOCOL

FIELD OF THE INVENTION

The invention relates generally to routing protocols used in computer networks and, more particularly, to a technique that isolates AFI/SAFI based errors or events occurring within a routing protocol in a computer network.

BACKGROUND OF THE INVENTION

A computer network is a geographically distributed collection of interconnected communication links used to transport data between nodes, such as computers. Many types of computer networks are available, with the types ranging from local area networks to wide area networks. The nodes typically communicate by exchanging discrete packets or messages of data according to pre-defined protocols. In this context, a protocol consists of a set of rules defining how the nodes interact with each other.

Computer networks may be further interconnected by an intermediate node, such as a switch or router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers. Yet it still may be desirable to increase the number of nodes capable of exchanging data; in this case, interdomain routers executing interdomain routing protocols are used to interconnect nodes of the various ASs.

An example of an interdomain routing protocol is the Border Gateway Protocol version 4 (BGP4), which performs routing between autonomous systems by exchanging routing information, e.g., network layer reachability information (NLRI), among neighboring interdomain routers of the systems. An adjacency is a relationship formed between selected neighboring (peer) routers for the purpose of exchanging routing information messages and abstracting the network topology. Before transmitting such messages, however, the peers cooperate to establish a logical "peer" connection (session) between the routers. BGP4 establishes reliable connections/sessions using a reliable/sequenced transport protocol, such as the Transmission Control Protocol (TCP).

The NLRI information exchanged by BGP peers typically includes destination address prefixes, i.e., the portions of destination addresses used by the routing protocol to render routing ("next hop") decisions. An example of such a destination address is the Internet Protocol (IP) version 4 (IPv4) address. A prefix implies a combination of an IP address and a mask that cooperate to describe an area of the network that a peer can reach. Each prefix may have a number of associated paths; each path is announced to a peer router by one or more of its peers. Note that the combination of a set of path attributes and a prefix is referred to as a "route"; the terms "route" and "path" may be used interchangeably herein. The BGP4 routing protocol standard is well known and described in *Request For Comments* (*RFC*) 1771, by Y. Rekhter and T. Li (1995), *Internet Draft* <draft-ietf-idr-bgp4-23.txt> titled, *A Border Gateway Protocol 4* (*BGP*-4) by Y. Rekhter, et al. (November 2003) and *Interconnections, Bridges and Routers*, by R. Perlman, published by Addison Wesley Publishing Company, at pages 323-329 (1992), all disclosures of which are hereby incorporated by reference.

BGP4 is generally capable of only carrying routing information for IPv4; accordingly, a multi-protocol extension to BGP4, referred to as BGP4+, extends BGP4 to allow carrying of routing information for multiple network layer protocols, such as IP version 6 (IPv6) and Internetwork Packet Exchange (IPX) addresses. BGP4+ extends BGP4 to associate these network layer protocols with next hop information and NLRI. Address Family Identifiers (AFIs) and Subsequent Address Family Identifiers (SAFIs) are used to identify the network layer protocols. BGP4+ and AFI/SAFI Address Family are well known and described in *RFC* 2858, by T. Bates et al. (2000) and *RFC* 1700 by J. Reynolds et al (1994), which are hereby incorporated by reference.

The interdomain routers configured to execute an implementation of the BGP protocol, referred to herein as BGP routers, perform various routing functions, including transmitting and receiving routing messages and rendering routing decisions based on routing metrics. The BGP protocol executing on each BGP router may be organized as a plurality of address family application modules, each of which is configured to provide an AFI/SAFI service such as IPv4/unicast, IPv4/multicast, IPv6/unicast or IPv6/multicast. Each AFI/SAFI service is enabled on a per peer basis by exchanging capabilities over the reliable BGP session between the router and its peer in accordance with *Capabilities Advertisement with BGP*4 described in *RFC* 3392 by R. Chandra et al (November 2002), which is hereby incorporated by reference. Two or more services may be enabled for two or more AFI/SAFI modules over the same BGP session and reliable transport.

Each BGP router also maintains a routing table that lists all feasible paths from that router to a particular network. The routing table is a database that contains routing information used to construct a forwarding table of a forwarding information base (FIB) that is used by the router when performing forwarding decisions on packets. Periodic refreshing of the routing table is generally not performed; however, BGP peer routers residing in the ASs exchange routing information under certain circumstances. For example, when a BGP router initially connects to the network, the peer routers exchange the entire contents of their routing tables. Thereafter when changes occur to those contents, the routers exchange only those portions of their routing tables that change in order to update their BGP peers' tables. These Update messages are thus incremental update messages sent in response to changes to the contents of the routing tables and announce only a best path to a particular network.

Broadly stated, a BGP router generates Update messages for an adjacency, also known as a peer router, by "walking-through" the routing table and applying appropriate routing policies. A routing policy is information that enables a BGP router to rank routes according to filtering and preference (i.e., the "best path"). Routing updates provided by the Update messages allows BGP routers of the ASs to construct a consistent view of the network topology. The Update messages are typically sent using a reliable transport, such as TCP, to ensure reliable delivery. TCP is a transport protocol implemented by a transport layer of the IP architecture; the term TCP/IP is commonly used to denote this architecture. The TCP/IP architecture is well known and described in *Computer Networks, 3rd Edition*, by Andrew S. Tanenbaum, published by Prentice-Hall (1996).

In particular, BGP peer routers use the Update messages to exchange routing information that is qualified by both AFI, such as IPv4, IPv6 or other address families, and SAFI, such as unicast, multicast or other applications, over a reliable BGP session. Often, an event may arise wherein a network administrator resets the BGP session for administrative reasons, e.g., to upgrade or enable a service of an AFI/SAFI module, or an error condition occurs with the module. The peers typically communicate the occurrence of the event or error condition through a conventional BGP Notification Message. However, a problem with the conventional Notification message is that it resets the BGP session (including reset of all the AFI/SAFI module services) and terminates the reliable transport between the routers. Thus, an event or error associated with one AFI/SAFI service provided over the transport penalizes all other services provided over that transport, resulting in routing "flaps" (streams of Update messages) for all AFI/SAFI modules supported by the peers.

One solution to this problem involves configuring multiple BGP sessions, one for each AFI/SAFI module or set of AFI/SAFI modules, between the peer routers. Each BGP session operates over a reliable (TCP connection) transport, typically by configuring multiple network layer (IP) addresses on each router and binding each session to a different IP address. Another solution involves multi-session BGP, wherein each of a plurality of BGP sessions is configured for each AFI/SAFI module or set of AFI/SAFI modules between a pair of BGP router peers. Here, rather than binding each session to a different IP address on each router, this approach shares an IP address over different sessions. However, each solution consumes resources (e.g., TCP bandwidth and associated control processing) that could be allocated more efficiently in the routers.

SUMMARY OF THE INVENTION

The present invention overcomes the disadvantages of the prior art by providing a soft notification technique that isolates address family application based errors or events occurring within a routing protocol, such as the Border Gateway Protocol (BGP), used to exchange routing information between a router and its peer router over a BGP session operating on a reliable transport. The technique apportions the session into a plurality of logical subsets, each of which is associated with an address family application (AFI/SAFI) module of the BGP protocol executing on the routers. Novel BGP soft notification messaging is employed to allow the router to notify its peer of an isolated error condition or event associated with an AFI/SAFI module. Isolation of the error/event enables restart ("soft reset") of only the associated AFI/SAFI module, thereby obviating the need to reset or terminate the entire BGP session and reliable transport between the router and peer. Notably, soft reset of the module occurs without disrupting services provided by other AFI/SAFI modules of the BGP protocol.

Advantageously, the inventive technique uses a single BGP session to exchange routing information related to different address family application (AFI/SAFI) modules to enable sharing of resources among the modules of the BGP protocol executing on the routers. Moreover, the soft notification technique logically separates the reliable trans-port from the AFI/SAFI modules to thereby allow scaling of BGP features and services over a single BGP session. Such logical separation allows a router to gracefully recover from an error condition and/or warn its peer about the occurrence of a BGP-related event pertaining to an AFI/SAFI module.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 6 is a schematic block diagram illustrating formats of MP_REACH_NLRI and MP_UNREACH_NLRI path attributes that may be advantageously used with the present invention;

DETAILED DESCRIPTION OF AN ILLUSTRATIVE EMBODIMENT

Figure 1:
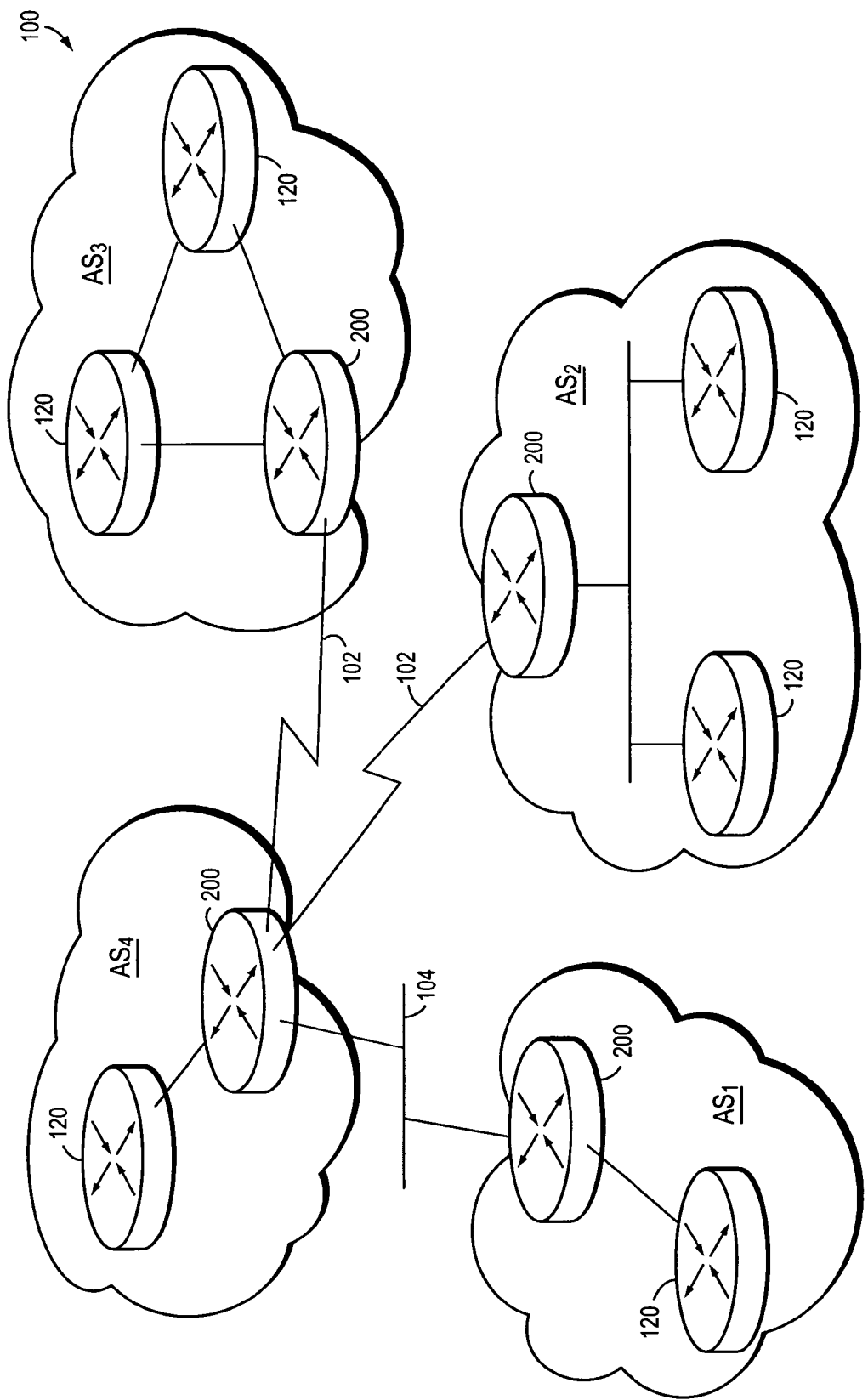
FIG. 1 is a schematic block diagram of a computer network comprising a plurality of routing domains interconnected by intermediate nodes, such as Border Gateway Protocol (BGP) interdomain routers.

FIG. 1 is a schematic block diagram of a computer network 100 comprising a plurality of routing domains interconnected by intermediate nodes. The intermediate nodes may comprise conventional switches but, in the illustrative embodiment, are conventional intradomain routers 120 and interdomain routers 200. The routing domains or autonomous systems ($AS_{1-4}$) are interconnected by the interdomain routers. The interdomain routers 200 are further interconnected by networks, such as local area networks 104, and point-to-point links 102, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 2:
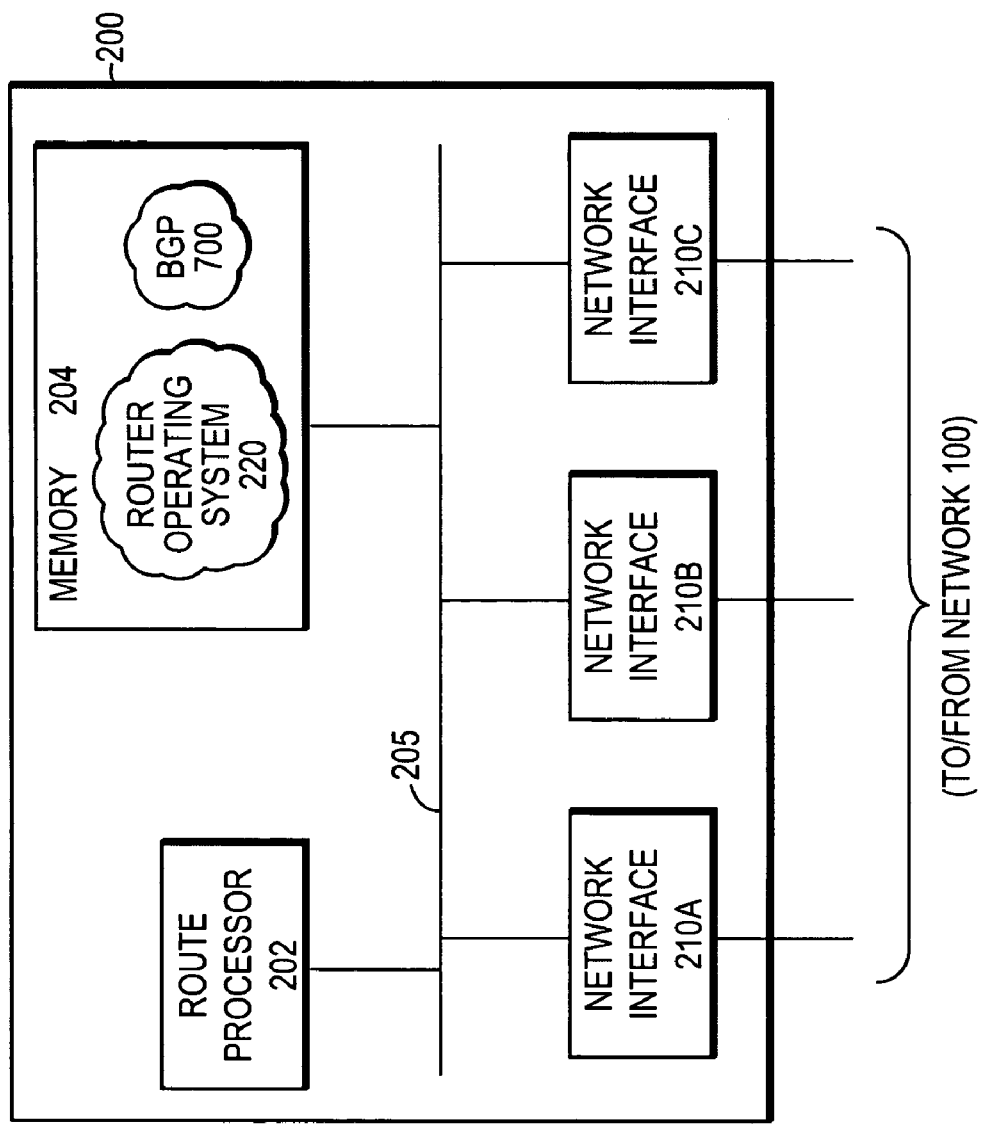
FIG. 2 is a schematic block diagram of an embodiment of an interdomain router that may be advantageously used with the present invention.

FIG. 2 is a schematic block diagram of an interdomain router 200 that may be advantageously used with the present invention. The interdomain router 200 comprises a route processor 202 coupled to a memory 204 and a plurality of network interface adapters $210_{A-C}$ via a bus 205. The memory 204 may comprise storage locations addressable by the processor and interface adapters for storing software programs and data structures that may be advantageously used with the inventive technique described herein. The route processor 202 may comprise processing elements or logic for executing the software programs and manipulating the data structures. An operating system 220, portions of which is typically resident in memory 204 and executed by the route processor, functionally organizes the router by, inter alia, invoking network operations in support of software processes and routing protocol modules executing on the router. As described herein, one such routing protocol is the Border Gateway Protocol version 4+(BGP 700). It will be apparent to those skilled in the art that other processor and memory means, including various computer readable media, may be used for storing and executing program instructions pertaining to the inventive technique described herein.

Figure 3:
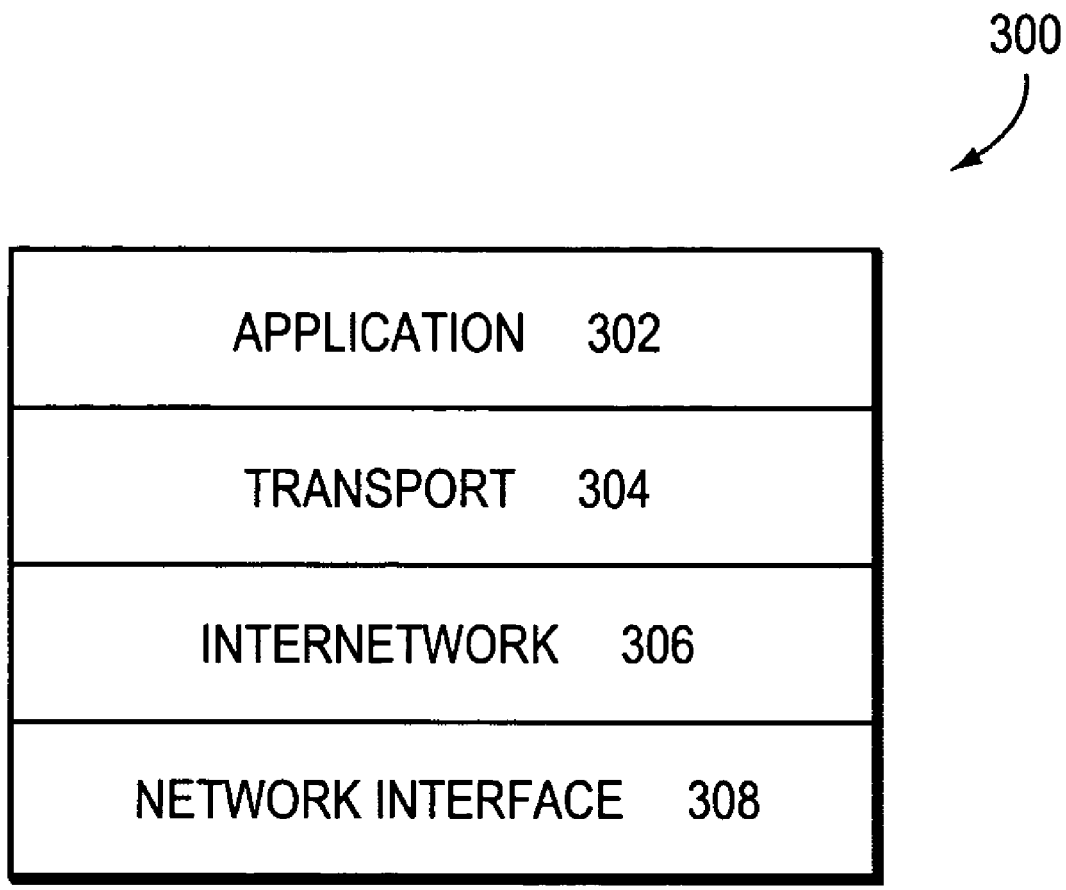
FIG. 3 is a schematic block diagram of a conventional protocol stack, such as the Internet communications protocol stack, within the interdomain router of FIG. 3.

A key function of the interdomain router 200 is determining the next router to which a packet is sent; in order to accomplish such "routing" the interdomain routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers may be implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability and other service characteristics. An example of such a transport protocol is the TCP protocol, which is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although it is not directly concerned with how forwarding information bases (FIBs) are constructed. An interdomain routing protocol, such as BGP, is used to perform interdomain routing (for the internetwork layer) through the computer network. The interdomain routers 200 (hereinafter "peers") exchange routing and reachability information among the autonomous systems over a reliable transport layer connection, such as TCP. An adjacency is a relationship formed between selected peer routers for the purpose of exchanging routing messages and abstracting the network topology. The BGP protocol "runs" on top of the TCP transport layer 304 to ensure reliable communication of routing messages among the peer routers.

In order to perform routing operations in accordance with the BGP protocol, each interdomain router 200 maintains a routing table that lists all feasible paths from that router to each network. The routers exchange the routing information using Update messages when their routing tables change. The Update messages are generated by an updating router to advertise best paths to each of its neighboring peer routers (peers) throughout the computer network. These routing updates allow the BGP routers of the autonomous systems to construct a consistent and up-to-date view of the network topology.

Figure 4:
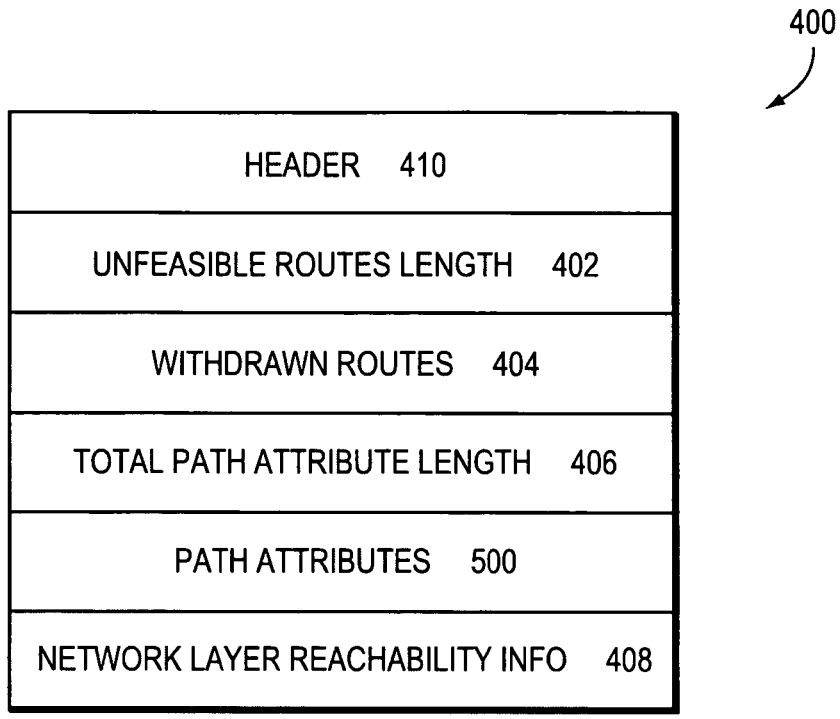
FIG. 4 is a schematic block diagram of a BGP Update message that may be advantageously used with the present invention.

FIG. 4 is a schematic block diagram of a conventional BGP Update message 400 comprising a plurality of fields appended to a header 410. A withdrawn (unfeasible) routes length field 402 indicates the total length of a withdrawn routes field 404, which illustratively contains a list of network layer (e.g., IP) address prefixes for the routes being withdrawn from service. A total path attribute length field 406 indicates the total length of a path attributes field 500 and a network layer reachability information (NLRI) field 408 illustratively contains a list of IP (IPv4) address prefixes. Note that the combination of a set of path attributes and a prefix is referred to as a "route"; the terms "route" and "path" may be used interchangeably herein. The format and function of the Update message 400 is described in *RFC* 1771 and *Interconnections, Bridges and Routers*.

Figure 5:
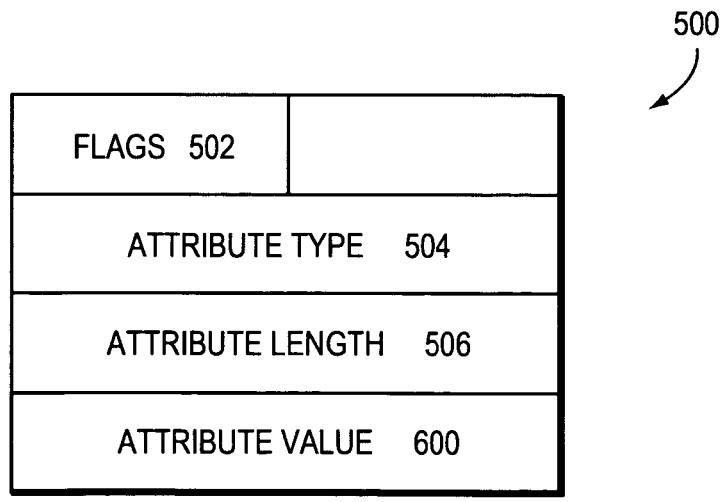
FIG. 5 is a schematic block diagram of a path attributes field of the BGP Update message that may be advantageously used with the present invention.

Specifically, the path attributes field 500 comprises a sequence of fields, each describing a path attribute in the form of a triple (i.e., attribute type, attribute length, attribute value). FIG. 5 is a schematic block diagram of the path attributes field 500 comprising a plurality of subfields including a flags subfield 502, an attribute type subfield 504, an attribute length subfield 506 and an attribute value subfield 600. In particular, the attribute type subfield 504 specifies a plurality of attribute type codes, examples of which illustratively include two path attributes defined by the BGP4+ protocol, Multiprotocol Reachable NLRI (MP_REACH_NLRI) type code 14 and Multiprotocol Unreachable NLRI (MP_UNREACH_NLRI) type code 15. The MP_REACH_NLRI attribute is used to carry a set of reachable destinations together with next hop information to be used for forwarding to these destinations. The MP_UNREACH_NLRI attribute is used to carry a set of unreachable destinations. Note that the path attributes are derived from a combination of configuration and protocol (i.e., propagated from the BGP protocol) information.

FIG. 6 is a schematic block diagram illustrating formats of MP_REACH_NLRI and MP_UNREACH_NLRI path attributes 610 and 650 contained in the attribute value subfield 600. The MP_REACH_NLRI path attribute 610 comprises a plurality of fields including, inter alia, an address family identifier (AFI) field 612, a subsequent address family identifier (SAFI) field 614, a length of next hop network address field 616 and a network address of next hop field 618. The AFI field 612 carries the identity of the network layer protocol associated with the network address contained in field 618. The SAFI field 614 provides additional information about the type of NLRI carried in the attribute. The length of next hop network address field 616 contains a value expressing the length of the network address of next hop contained in field 618.

The MP_UNREACH_NLRI path attribute 650 comprises a plurality of fields including an address family identifier (AFI) field 652, a subsequent address family identifier (SAFI) field 654 and a withdrawn routes field 656. The AFI field 652 carries the identity of the network layer protocol associated with the NLRI contained in field 656 and the SAFI field 654 provides additional information about the type of NLRI carried in the attribute. The withdrawn routes field 656 lists NLRI for routes that are being withdrawn from service.

Figure 7:
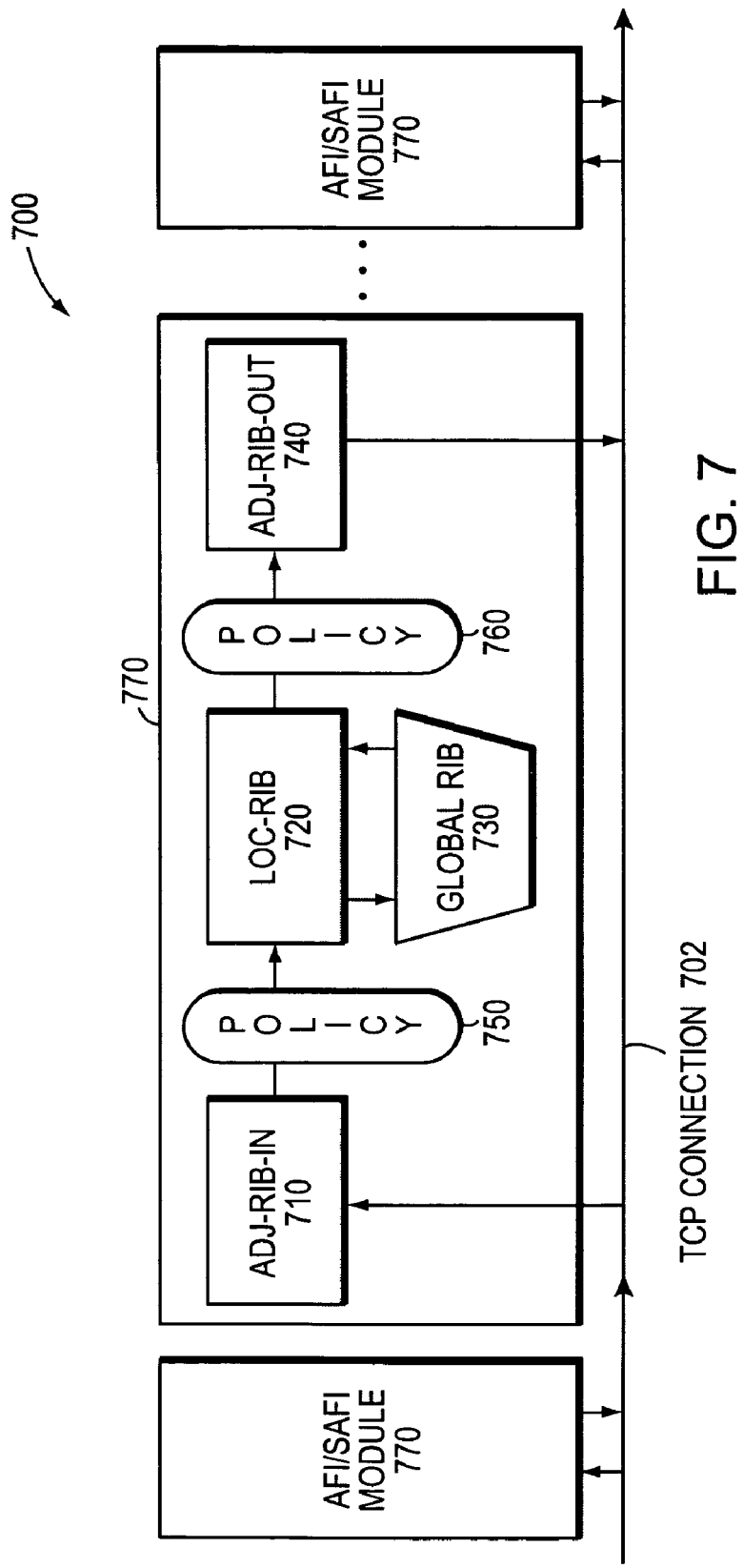
FIG. 7 is a schematic block diagram depicting an illustrative architecture of the BGP protocol.

FIG. 7 is a schematic block diagram depicting an illustrative architecture of the BGP protocol 700 executing on router 200. As noted, the BGP protocol enables the exchange of routing information among BGP peers using Update messages 400 that include path attributes that identity a network layer protocol and a type of NLRI. The BGP protocol 700 is illustratively organized as a plurality of address family application (AFI/SAFI) modules 770, each of which is configured to provide a service such as IPv4/unicast, IPv4/multicast, IPv6/unicast or IPv6/multicast. Note that the inventive technique described herein may apply to other address family application modules configured to provide other services. Each AFI/SAFI service is enabled on a per peer basis by exchanging capabilities over the reliable BGP session between the router and its peer. Two or more services may be enabled for two or more AFI/SAFI modules 770 over the same BGP session and reliable transport.

Specifically, the peer routers announce routing updates via a TCP connection 702. Each TCP connection establishes the reliable transport for the BGP session over which Update messages 400 are exchanged between the peers. The BGP protocol "listens" for these Update messages 400 and stores all learned routes for each connection in a BGP database. The BGP database is illustratively organized as Adjacency RIB In (Adj-RIB-In 710), Adjacency RIB Out (Adj-RIB-Out 740) and local RIB (loc-RIB 720). Each peer/TCP connection 702 is associated with an Adj-RIB-In 710 and an Adj-RIB-Out 740. The BGP protocol runs inbound policy on all routes "learned" for each connection 702 and those routes that match are stored in an Adj-RIB-In 710 unique to that connection. Additional inbound policy 750 (filtering) is then applied to those stored routes, with a potentially modified route being installed in the loc-RIB 720.

The loc-RIB stores routes that are similar to the routes in the forwarding table; to that end, the loc-RIB 720 is generally responsible for selecting the best route per prefix from the union of all policy-modified Adj-RIB-In routes, resulting in routes referred to as "best paths". The set of best paths is then installed in the global RIB 730, where those paths may contend with best paths from other protocols to become the "optimal" path ultimately selected for forwarding. The global RIB 730 illustratively maintains the routing table for the router. Note that the routing table typically denotes a database containing all available routes, including ones that have been selected for forwarding (optimal paths) as well as, in some cases, backup routes that are not currently selected for forwarding. In contrast, the forwarding table denotes those optimal best paths that have actually been selected for forwarding. Thereafter, the set of best paths has outbound policy 760 run on it, the result of which is placed in the appropriate Adj-RIB-Out 740 and announced to the respective peers via the same TCP connection 702 from which Update messages were learned.

Often, an event may arise wherein a network administrator resets the BGP session for administrative reasons, e.g., to upgrade or enable a service of an AFI/SAFI module 770, or an error condition occurs with the module. The peers typically communicate the occurrence of the event or error condition through a conventional BGP Notification Message. However, a problem with the conventional Notification message is that it resets the BGP session (including reset of all the AFI/SAFI module services) and terminates the reliable transport connection 702 between the routers. Thus, an event or error associated with one AFI/SAFI service provided over the transport penalizes all other services provided over that transport.

The present invention is directed to a soft notification technique that isolates address family application (AFI/SAFI) based errors or events occurring within a routing protocol, such as the Border Gateway Protocol (BGP), used to exchange routing information between a router and its peer router over a BGP session operating on a reliable transport. The technique apportions the session into a plurality of logical subsets, each of which is associated with an address family application (AFI/SAFI) module 770 of the BGP protocol 700. Novel BGP soft notification messaging is employed to allow the router to notify its peer of an isolated error condition or event associated with an AFI/SAFI module. Isolation of the error/event enables restart ("soft reset") of only the associated AFI/SAFI module, thereby obviating the need to reset or terminate the entire BGP session and reliable transport (connection 702) between the router and peer. Notably, soft reset of the module occurs without disrupting services provided by other is AFI/SAFI modules of the BGP protocol.

According to the soft notification technique, a new BGP message type, the BGP Soft Notification message, is defined that allows a network administrator to soft reset an AFI/SAFI module 770 without terminating the BGP session and without impacting services provided by other AFI/SAFI modules. The BGP Soft Notification message is described in *Internet Draft*, http://www.ietf.org/internet-drafts/draft-nalawade-bgp-softnotify-00.txt titled, *BGPv4 Soft-Notification Message* by G. Nalawade et al (October 2003), which is hereby incorporated by reference.

Figure 8:
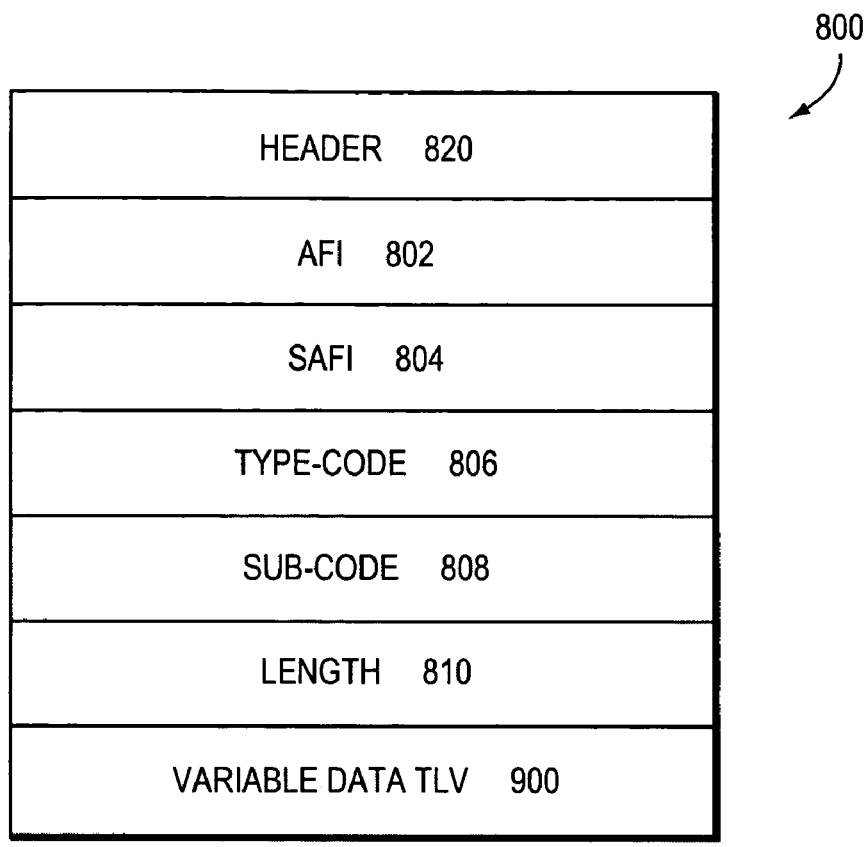
FIG. 8 is a schematic block diagram of a Soft Notification message in accordance with the present invention.

FIG. 8 is a schematic block diagram of a Soft Notification message 800 in accordance with the present invention. In the illustrative embodiment, the Soft Notification message is a BGP message having a predetermined type. As a BGP message, the Soft Notification message 800 includes a fixed-size BGP header 820. In addition, the Soft Notification message includes an AFI field 802, a SAFI field 804, a type-code field 806, a sub-code field 808, a length field 810 and a variable data TLV field 900. Illustratively, the AFI/SAFI fields contain values that indicate the AFI/SAFI module 770 for which the error condition or event has occurred and needs to be soft reset. A first reserved value indicates that the Soft Notification message 800 applies to all AFI/SAFI services, whereas a second reserved value contained in only the SAFI field 804 indicates that the message applies to all SAFI services under a particular AFI service. Note that the values contained in AFI field 802 and SAFI field 804 are defined in http://www.iana.org/assignments/address-family-numbers and http://www.iana.org/assignments/safi-namespace.

The type-code field 806 contains a value that indicates an error condition or event for a respective AFI/SAFI module 770. In the illustrative embodiment, the following type-codes, which are generally described in *RFC* 1771 and *A Border Gateway Protocol* 4 (*BGP*-4), are defined:

| Error Code | Symbolic Name |
|---|---|
| 1 | Update Message Error |
| 2 | Cease |
| 3 | Event |

Figure 9:
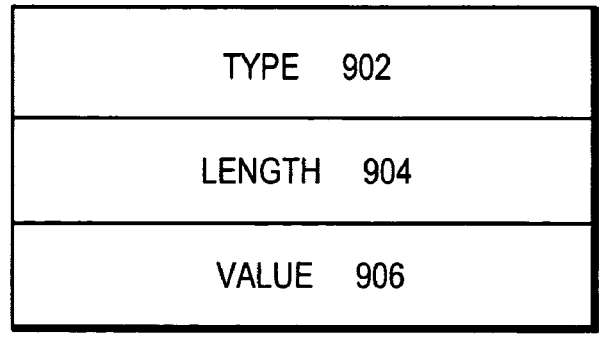
FIG. 9 is a schematic block diagram of a Variable Data TLV in accordance with the present invention.

The sub-code field 808 contains a value that defines a subcode related to the error condition or event conveyed by the message. In the illustrative embodiment, the following sub-codes, which are generally described in *RFC* 1771 and *A Border Gateway Protocol* 4 (*BGP*-4), are defined:

Update Message Error Subcodes
1—Malformed Attribute List.
2—Unrecognized Well-known Attribute
3—Missing Well-known Attribute
4—Attribute Flags Error
5—Invalid Attribute Length
6—Invalid ORIGIN Attribute
7—Invalid NEXT_HOP Attribute
8—Optional Attribute Error
9—Invalid Network Field 10—Bad ASPATH
11—Invalid Message Type.
Cease Message Error Subcodes
1—Maximum Number of Prefixes Reached
2—Administratively Shutdown
3—Peer Unconfigured
4—Administratively Reset
5—Other Configuration Change
Event Message Subcodes
1—ACK Soft Notification
2—Peer Administratively Unshut
3—Peer Configured
4—Timer Expired
5—Dampening Routes
6—Undampened Routes The length field 810 contains the length of the remaining message and the Variable Data TLV field 900 is an optional, variable length field that contains a Variable Data TLV. TLV encoding is a generic way to communicate information between two nodes, such as routers, where the information may not be entirely known to one router. Accordingly, the Variable Data TLV field 900 may be used to carry additional information about the error condition or event. FIG. 9 is a schematic block diagram of the Variable Data TLV 900 in accordance with the present invention. The Variable Data TLV includes a type field 902 used to identify a type (T) of information being conveyed, a length field 904 used to identify the length (L) of information to be conveyed and a value field 906 containing a value (V) of the actual information conveyed.

An advantage of TLV-based communication is that a router can skip over any type of information that it is not configured to "understand". That is, using the length (L) parameter, the router can skip an attribute (TLV) it doesn't understand, until it finds a TLV for which it is configured. The length (L) parameter is implementation-specific and can denote the length from the beginning of the first field of the attribute to the end. However, the length generally denotes the length of the value (V) field and not the type field or length field. Note that no TLV may appear in a Soft Notification message more than once. In the illustrative embodiment, the following TLVs are defined:

| Type | Name | Length | Value |
| --- | --- | --- | --- |
| 1 | string | variable | a text string whose length is specified by the length field. Not null terminated. |
| 2 | PDU | variable | a copy of the PDU that triggered the Soft Notification message. May be truncated. |
| 3 | attribute | variable | a copy of the path attribute that triggered the Soft Notification message. May be truncated. |
| 4 | integer | 4 octets | a four-octet integer |

A BGP router may generate a Soft Notification message 800 for relevant AFI/SAFI modules 770 in lieu of a conventional Notification Message using relevant type-codes and sub-codes, as redefined herein. The BGP router may also generate a Soft Notification message in case of an Event. According to the invention, BGP soft notification messaging separates BGP functionality on a per BGP peer, AFI/SAFI basis. The soft notification technique assists in isolating the reliable transport, e.g., TCP, from actual protocol services/features which, in turn, prevents BGP peers from resetting the TCP transport 702 for any protocol errors related to its specific AFI/SAFI module 770. Preventing transport disruptions further assists in isolating network outages to specific AFI/SAFI errors.

The following flowcharts apply to the processing of the novel BGP Soft Notification message 800 with the various error type codes described above. When receiving a BGP Soft Notification Message sent from a router, a peer takes an action based on the type code contained in the message. The router also takes an action after it has sent the Soft Notification message to its peer. It should be noted that the actions taken by the router and its peer do not necessarily have to occur (and, if fact, may not occur) in the sequence shown and described. Therefore, the following flowcharts are only illustrative of one set of examples and not prescriptive. It should be further noted that a Soft Notification message having a type-code "Event" and a sub-code "ACK Soft-Notification" is referred to herein as a "Soft-Notify-ACK".

Figure 10:
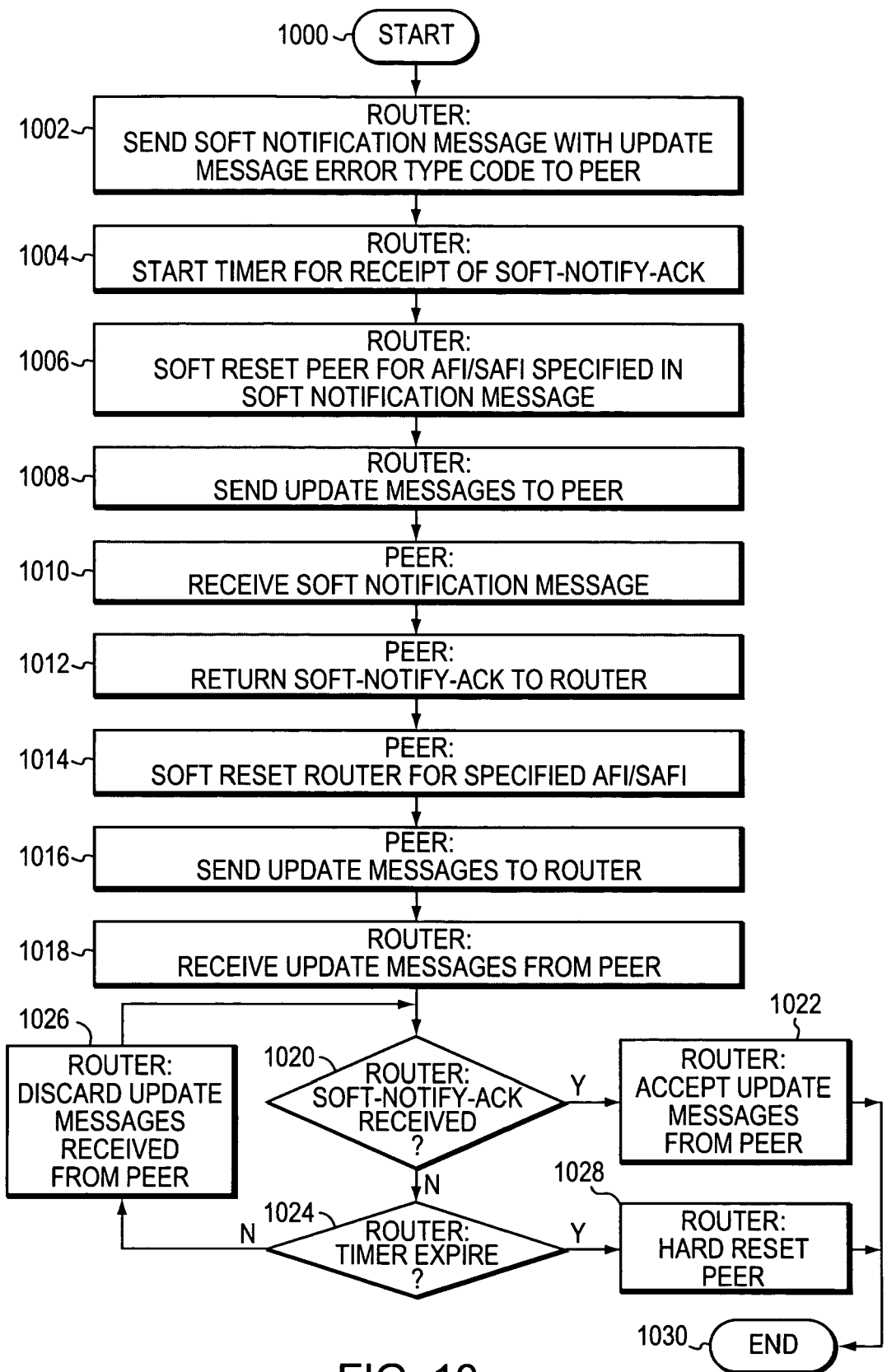
FIG. 10 is a flowchart illustrating a procedure involving a Soft Notification message with Update Message Error type code in accordance with the present invention.

FIG. 10 is a flowchart illustrating a procedure involving a Soft Notification message with Update Message Error type code issued from a router to its peer. The procedure starts at Step 1000 and proceeds to Step 1002 where the router sends a Soft Notification message with Update Message Error type code to the peer. In Step 1004, the router starts a timer for a receipt of a Soft-Notify-ACK from the peer. Thereafter, in Step 1006, the router "soft resets" the peer for the AFI/SAFI specified in the Soft Notification message by, e.g., discarding any Update messages from the peer until the Soft-Notify-ACK is received and flushing the routes (in, e.g., Adj-RIB-In 710) for the peer for the AFI/SAFI specified in the Soft Notification message. In Step 1008, the router begins sending new Update messages to the peer.

Upon receiving the Soft Notification message containing the Update Message Error type code (Step 1010), the peer returns the Soft-Notify-ACK to the sending router in Step 1012. In Step 1014, the peer soft resets the router for that AFI/SAFI by, e.g., flushing the routes of the router for the AFI/SAFI. In Step 1016, the peer then proceeds to re-advertise its own routes by sending Update messages to the router. In Step 1018, the router receives the Update messages from the peer and, in Step 1020, determines whether the Soft-Notify-ACK has been received. If so, the router resumes accepting Update messages from the peer in Step 1022 and the procedure ends at Step 1030. Otherwise, the router determines whether the Soft Notification timer has expired (Step 1024). If not, the router discards any Update messages from the peer in Step 1026 and the procedure returns to Step 1020. However, if the Soft Notification timer expires before receipt of the Soft-Notify-ACK, the router "hard resets" the peer (Step 1028) by terminating the BGP session and the sequence ends at Step 1030.

Figure 11:
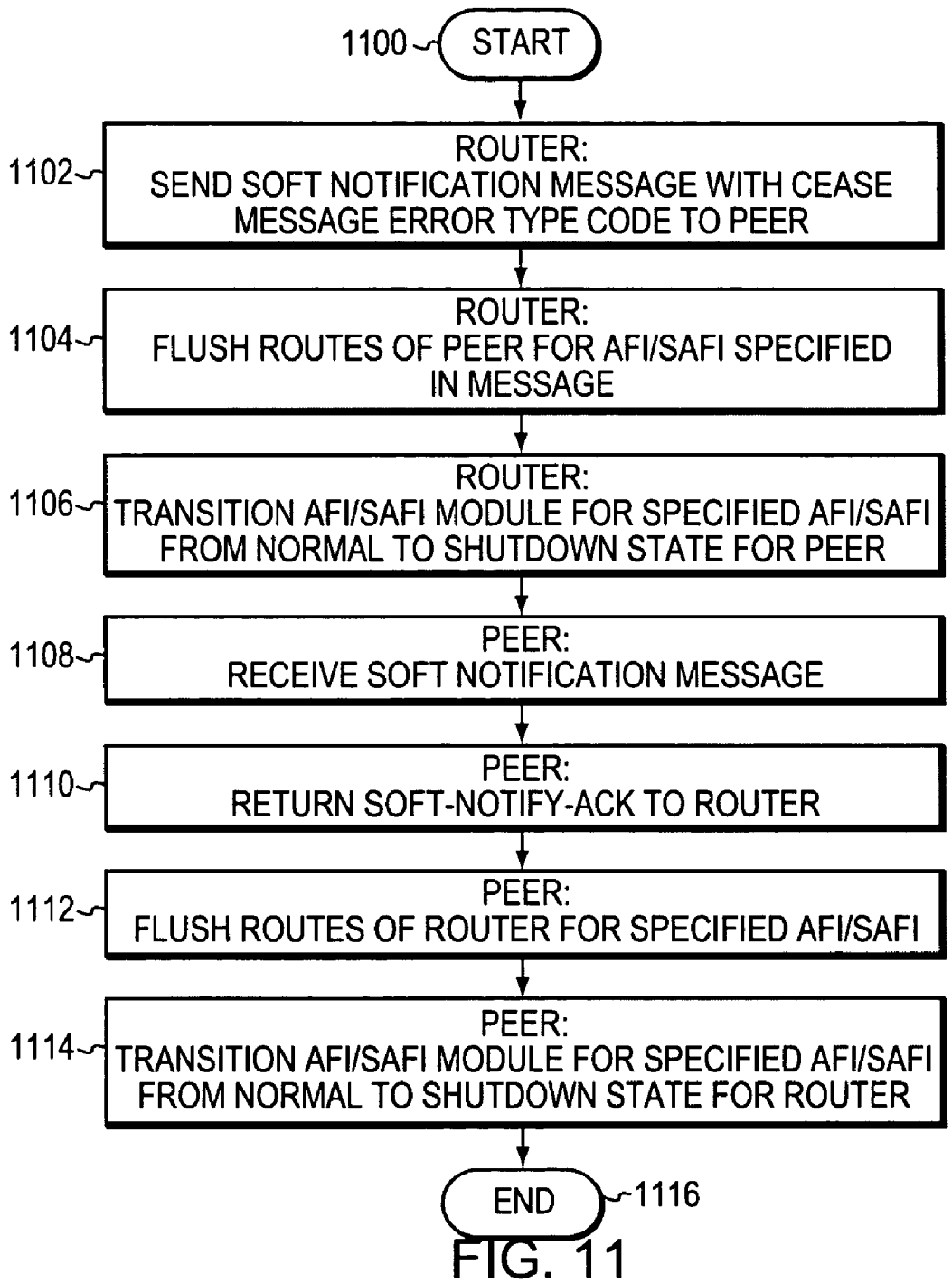
FIG. 11 is a flowchart illustrating a procedure involving a Soft Notification message with Cease Message Error type code in accordance with the present invention.

FIG. 11 is a flowchart illustrating a procedure involving a Soft Notification message with Cease Message Error type code issued from a router to its peer. The procedure starts at Step 1100 and proceeds to Step 1102 where the router sends a Soft Notification message with Cease Message Error type code to the peer. In Step 1104, the router flushes the routes of the peer for the AFI/SAFI specified in the message and, in Step 1106, transitions its AFI/SAFI module for the specified AFI/SAFI from a normal state to a shutdown state for that peer. In the illustrative embodiment described herein, a shutdown state of an AFI/SAFI for a peer is a state in which a router will not accept and process any Update messages from the peer. In Step 1108, the peer receives the Soft Notification message with the Cease Message Error type code and, in Step 1110, returns a Soft-Notify-ACK to the router. In Step 1112, the peer flushes the routes of the router for the specified AFI/SAFI and, in Step 1114, transitions its AFI/SAFI module for the specified AFI/SAFI from a normal state to a shutdown state for the router. The procedure then ends at Step 1116.

Figure 12:
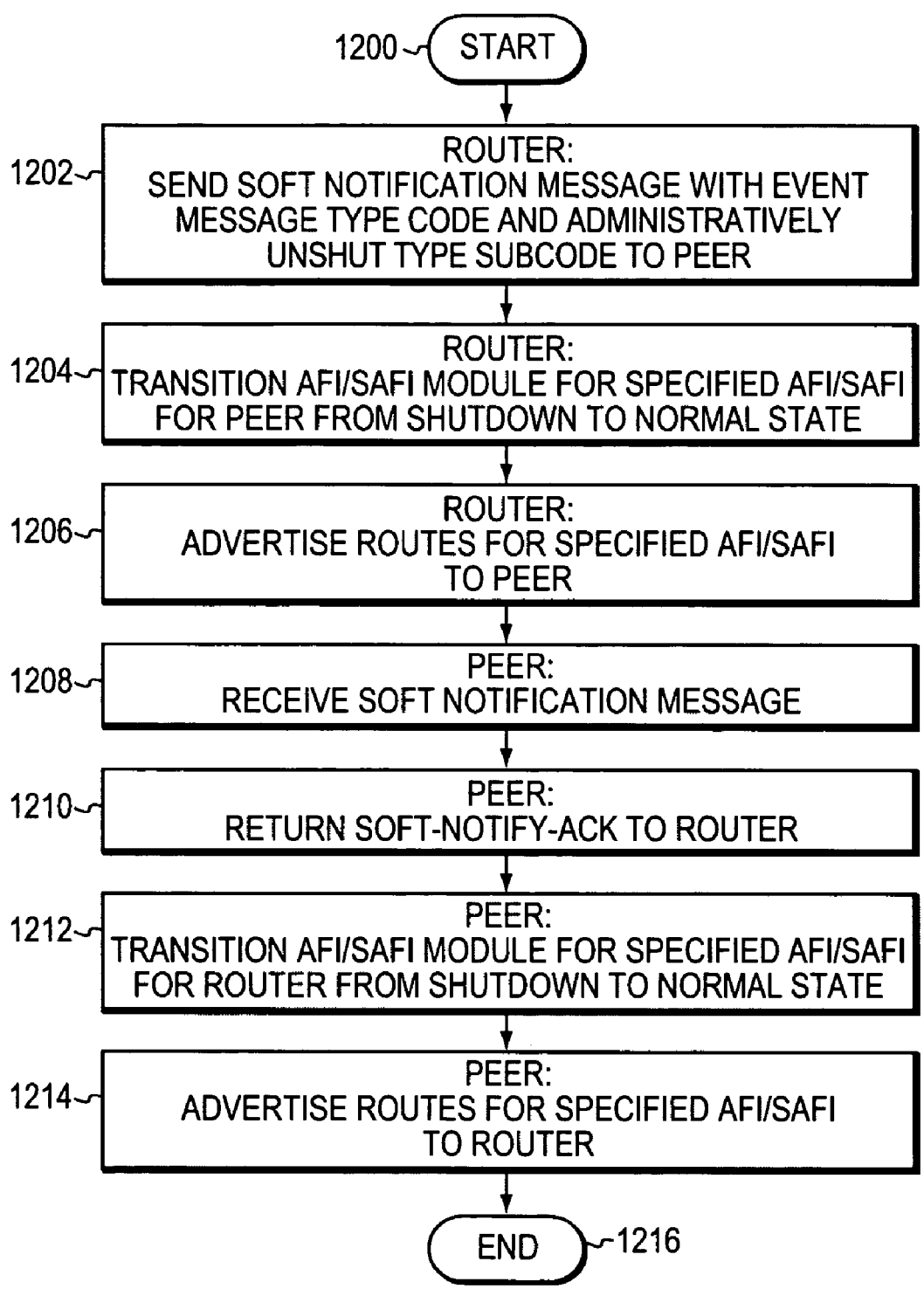
FIG. 12 is a flowchart illustrating a procedure involving a Soft Notification message with Event Message Error type code in accordance with the present invention.

FIG. 12 is a flowchart illustrating a procedure involving a Soft Notification message with Event Message type code issued from a router to its peer. The procedure starts at Step 1200 and proceeds to Step 1202 where the router sends a Soft Notification message with Event Message type code and Administratively Unshut type subcode to the peer. In Step 1204, the router transitions the AFI/SAFI module for the specified AFI/SAFI for the peer from the shutdown state to the normal state (in response to receiving the Soft-Notify-ACK that is returned in Step 1210). In Step 1206, the router then advertises its routes for that AFI/SAFI to the peer. In Step 1208, the peer receives the Soft Notification message with Event Message type code and Administratively Unshut type subcode. In Step 1210, the peer returns a Soft-Notify-ACK to the router and, in Step 1212, transitions its AFI/SAFI module for the specified AFI/SAFI from the shutdown state to the normal state. Note that if the Soft Notification message contains any Event Message type subcode other than Administratively Unshut and Soft-Notify-ACK, the peer returns a Soft-Notify-ACK to the router and may choose to log the message. In Step 1214, the peer then advertises its routes for the relevant AFI/SAFI to the router and the sequence ends at Step 1216.

Advantageously, the inventive technique uses a single BGP session to exchange routing information related to different AFI/SAFI modules to enable sharing of resources among the modules of the BGP protocol executing on the routers. Moreover, the soft notification technique logically separates the reliable transport from the AFI/SAFI modules to thereby allow scaling of BGP features and services over a single BGP session. Such logical separation allows a router to gracefully recover from an error condition and/or warn its peer about the occurrence of a BGP-related event pertaining to an AFI/SAFI module.

While there has been shown and described embodiments of a soft notification technique that isolates AFI/SAFI based errors occurring within a routing protocol, such as BGP, it is to be understood that various other adaptations and modifications may be made within the spirit and scope of the present invention. For example, the technique contemplates a situation where a router sends multiple Soft Notification messages to a peer. Here, sending of Soft Notification messages and soft resetting of the peer for a particular AFI/SAFI module should be rate-limited, with a mechanism being provided for exponential "back-off". Specifically, in response to sending multiple Soft Notification messages, the router tracks those messages that are not yet acknowledged. Upon receiving a Soft-Notify-ACK from the peer, the router associates that acknowledgement with the earliest Soft Notification message pending a Soft-Notify-ACK.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various processes described herein, can be implemented as software, including a computer-readable medium having program instructions executing on a computer, hardware, firmware, or a combination thereof. In addition, it is understood that the data structures described herein can include additional information while remaining within the scope of the present invention. The inventive technique may also apply generally to a new capability code that is defined for the BGP Soft Notification message. Here, a BGP Soft Notification message can only be sent by a router to peers that have advertised this capability. Furthermore, the inventive technique may apply to other routing protocols such as, e.g., distance vector routing protocols, that support multiple AFI/SAFIs. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system to isolate address family application based errors or events occurring within a routing protocol used to exchange routing information between a router and its peer over a session operating on a reliable transport in a computer network, the system comprising:

a plurality of address family application modules of the routing protocol, wherein each module is configured to provide a service and wherein two or more services provided by two or more modules are enabled over the session and reliable transport; and a route processor of the router, the route processor configured to create a Soft Notification message to notify its peer of an error condition or event associated with one of the two or more modules, the Soft Notification message further enabling soft reset of only one of the modules to thereby obviate resetting or terminating of the session and reliable transport, wherein the address family application modules are Address Family Identifier (AFI)/Subsequent Address Family Identifier (SAFI) modules and the Soft Notification message includes an AFI field and a SAFI field, and wherein the AFI/SAFI fields contain values that indicate the AFI/SAFI module for which the error condition or event has occurred and needs to be soft reset and a first reserved value indicates that the Soft Notification message applies to all AFI/SAFI services and wherein a second reserved value contained in only the SAFI field indicates that the Soft Notification message applies to all SAFI services under a particular AFI service.

2. The system of claim 1 wherein the routing protocol is the Border Gateway Protocol version 4+ (BGP) and wherein the session is a BGP session.

3. The system of claim 1 wherein the reliable transport is a Transmission Control Protocol connection between the router and peer.

4. The system of claim 1 wherein the Soft Notification message is a BGP message having a predetermined type and a fixed-size header.

5. The system of claim 1 wherein the Soft Notification message further includes a type-code field containing a value that indicates the error condition or event for a respective AFI/SAFI module.

6. The system of claim 5 wherein the Soft Notification message further includes a sub-code field containing a value that defines a sub-code related to the error condition or event conveyed by the Soft Notification message.

7. The system of claim 6 wherein the Soft Notification message further includes a variable data Time-Length-Value (TLV) field used to carry additional information about the error condition or event.

8. A method for isolating Address Family Identifier (AFI)/Subsequent Address Family Identifier (SAFI) based errors or events occurring within a BGP protocol used to exchange routing information between a router and its peer over a BGP session operating on a reliable transport in a computer network, the method comprising the steps of:

sending a Soft Notification message with Update Message Error type code from the router to the peer;

starting a timer for a receipt of a Soft-Notify-Acknowledge (ACK) from the peer;

soft resetting the peer for an AFI/SAFI specified in the Soft Notification message;

sending first Update messages from the router to the peer;

receiving second Update messages from the peer at the router;

determining whether the Soft-Notify-ACK has been received from the peer;

if so, accepting the second Update messages from the peer;

if not, determining whether the timer has expired;

if the timer has not expired, discarding the second Update messages; and if the timer has expired, hard resetting the peer at the router.

9. The method of claim 8 wherein the step of soft resetting comprises:

resetting only an AFI/SAFI module for the AFI/SAFI specified in the Soft Notification message, while not resetting the reliable transport coupling the router and the peer.

10. The method of claim 9 wherein the AFI/SAFI module provides a service selected from the group consisting of IPv4/unicast, IPv4/multicast, IPv6/unicast and IPv6/multicast.

11. The method of claim 8 wherein the Soft Notification message further includes a sub-code field that indicates a condition related to the Soft-Notify-ACK.

12. A method for isolating Address Family Identifier (AFI)/Subsequent Address Family Identifier (SAFI) based errors or events occurring within a BGP protocol used to exchange routing information between a router and its peer over a BGP session operating on a reliable transport in a computer network, the method comprising the steps of:

sending a Soft Notification message with Cease Message Error type code from the router to the peer;

flushing routes of the peer for an AFI/SAFI specified in the Soft Notification message; and transitioning only an AFI/SAFI module for the specified AFI/SAFI on the router from a normal state to a shutdown state for the peer, without resetting the BGP session or the reliable transport in the computer network.

13. The method of claim 12 wherein the AFI/SAFI module is configured to provide a service selected from the group consisting of IPv4/unicast, IPv4/multicast, IPv6/unicast and IPv6/multicast.

14. The method of claim 12 wherein the Soft Notification message further includes a sub-code field that indicates a condition related to an Event Message type code.

15. The method of claim 12 wherein the shutdown state is a state that prevents accepting and processing Update messages from the peer.

16. The method of claim 12 further comprising:

maintaining the reliable transport coupling the router and the peer.

17. A method for isolating Address Family Identifier (AFI)/Subsequent Address Family Identifier (SAFI) based errors or events occurring within a BGP protocol used to exchange routing information between a router and its peer over a BGP session operating on a reliable transport in a computer network, the method comprising the steps of:

sending a Soft Notification message with Event Message type code and Administratively Unshut type subcode from the router to the peer;

transitioning only an AFI/SAFI module on the router for an AFI/SAFI specified in the message from a shutdown state to a normal state for the peer, without resetting the BGP session or the reliable transport in the computer network; and advertising routes for the specified AFI/SAFI from the router to the peer.

18. The method of claim 17 further comprising:

providing a service by the AFI/SAFI module, the service selected from the group consisting of IPv4/unicast, IPv4/multicast, IPv6/unicast and IPv6/multicast.

19. The method of claim 17 wherein the Soft Notification message further includes a sub-code field that indicates a condition related to a Cease Message Error type code.

20. The method of claim 17 wherein the shutdown state is a state that prevents accepting and processing Update messages from the peer.

21. An apparatus comprising:

a plurality of address family application modules of a routing protocol, each of the address family application modules configured to provide a different service, wherein two or more services provided by two or more address family application modules are enabled in a session between the apparatus and a peer over a reliable transport; and a route processor, the route processor configured to create and send a message to the peer to notify the peer of an error condition or event associated with one of the two or more address family application modules, the route processor further configured to soft reset only the one of the two or more address family application modules associated with the error condition or event, without resetting or terminating the session or the reliable transport.

22. The apparatus of claim 21 wherein the address family application modules are Address Family Identifier (AFI)/Subsequent Address Family Identifier (SAFI) modules.

23. The apparatus of claim 22 wherein the service provided by each AFI/SAFI module is one of IPv4/unicast, IPv4/multicast, IPv6/unicast and IPv6/multicast.

24. The apparatus of claim 23 wherein the message includes an AFI field and a SAFI field, and wherein the AFI/SAFI fields contain values that indicate the AFI/SAFI module associated with the error condition or event needs to be soft reset.

25. The apparatus of claim 21 wherein the routing protocol is a Border Gateway Protocol (BGP) and wherein the session is a BGP session.

26. The apparatus of claim 25 wherein the message is a BGP message of a predetermined type.

27. The apparatus of claim 21 wherein the reliable transport is a Transmission Control Protocol (TCP) connection between the apparatus and peer.

28. The apparatus of claim 21 wherein the message further includes a Time-Length-Value (TLV) field used to carry information about the error condition or event.

29. A method comprising:

organizing a routing protocol executing on a router as a plurality of address family application modules, each of the address family application modules configured to provide a different service;

enabling two or more address family application modules in a session between the router and a peer over a reliable transport;

notifying the peer of an isolated error condition or event associated with one of the address family application modules; and resetting only the address family application module associated with the error condition or event without resetting or terminating the session or the reliable transport.

30. The method of claim 29 further comprising:

apportioning the session into a plurality of logical subsets, each subset associated with a different address family application module.

31. The method of claim 29 wherein the address family application modules are Address Family Identifier (AFI)/Subsequent Address Family Identifier (SAFI) modules.

32. The method of claim 31 wherein the service provided by each AFI/SAFI module is one of IPv4/unicast, IPv4/multicast, IPv6/unicast and IPv6/multicast.

33. The method of claim 29 wherein the routing protocol is a Border Gateway Protocol (BGP) and wherein the session is a BGP session.

34. The method of claim 29 wherein the reliable trans-port is a Transmission Control Protocol (TCP) connection between the router and peer.

* * * * *

UNITED STATES PATENT AND TRADEMARK OFFICE
CERTIFICATE OF CORRECTION

| | |
|---|---|
| PATENT NO. | : 7,633,874 B1 |
| APPLICATION NO. | : 10/833811 |
| DATED | : December 15, 2009 |
| INVENTOR(S) | : Gargi Nalawade |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Col. 8, Line 8, should read as shown:

other[[ is]] AFI/SAFI modules of the BGP protocol.

Col. 8, Line 16, should read as shown:

[[bgp-softnotify-- 00.txt]] bgp-soft-notify--00.txt titled, *BGPv4 Soft-Notification Mes-*

Signed and Sealed this

Second Day of November, 2010

David J. Kappos
*Director of the United States Patent and Trademark Office*